May 15, 1928.
B. DYRSKOG
REAMING TOOL
Filed March 14, 1927
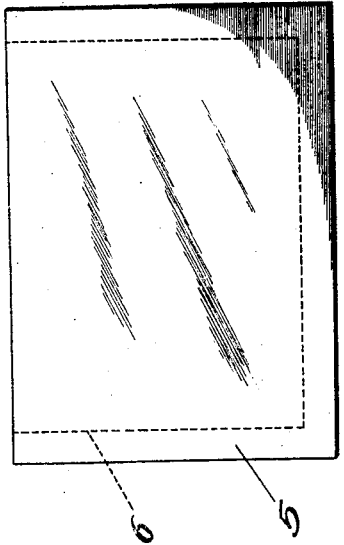
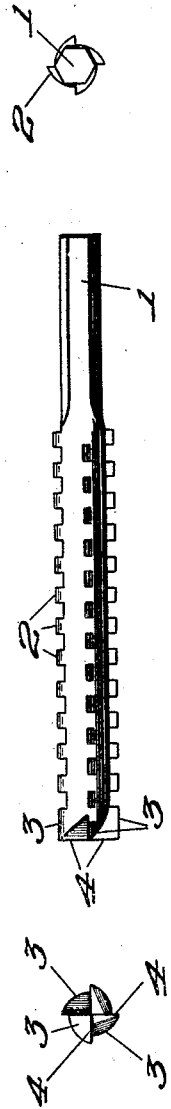
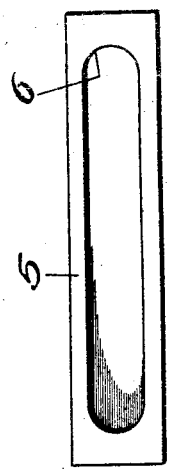

Patented May 15, 1928.

1,669,697

UNITED STATES PATENT OFFICE.

BERTEN DYRSKOG, OF MIDAS, IDAHO.

REAMING TOOL.

Application filed March 14, 1927. Serial No. 175,284.

This invention relates to improvements in reaming tools and its object is to provide a simple, efficient tool of this type that combines speed and economy in operation. The present invention contemplates a solid or one-piece reamer thereby insuring high grade cutting quality, durability and solidity in operation.

With the foregoing and other objects in view the invention will be fully set forth in the following description, pointed out in the appended claim and illustrated in the accompanying drawing which forms a part of this application and in which—

Fig. 1 is a view of the reaming tool in elevation.

Figs. 2 and 3 are end views of the tool.

Fig. 4 is a view in side elevation of one type of work that may be turned out by means of the tool.

Fig. 5 is a top plan view of Fig. 4.

Like reference characters denote corresponding parts throughout the several views.

This tool is adapted primarily for reaming out wood by movement of the cutter or drill. The tool is formed from a bar of steel, the end 1 of which is adapted for insertion in the chuck of the drill. This bar is formed with a plurality, preferably four in number, of rows of teeth, the four rows being equidistant one from the other and the teeth thereof being identical in size, shape and formation except that the teeth of one row are staggered relative to those of the adjacent row. All of the teeth 2 in any row are identical in size and are spaced apart the same distance throughout except the final tooth 3 at the remote end of each row, the terminal teeth of the successive rows being successively large and small so that, in effect, a rotary knife having alternately large and small teeth or blades is formed at one end of the steel bar.

The cutting or reaming operation is started by this rotary knife at the end of the bar, this knife having cutting edges in alignment with the teeth 2 and also cutting edges 4 disposed at right angles to the last noted edges, the metal being here beveled and sharpened to form the said cutting edges 4. As the reamer is applied to the work 5 the cutting edges 4 cut a recess 6 which is elongated by the teeth 2 to form the cavity desired in the work.

What is claimed is:—

A reaming tool formed of a bar of metal having four straight rows of teeth spaced equidistant one from the other, said rows extending longitudinally of the bar throughout the greater part of its length, the teeth of the successive rows being staggered with relation to each other except the terminal teeth, the terminal teeth being alternately large and small and each formed with two cutting edges, the two edges of each tooth being disposed at right angles to each other, substantially as and for the purpose set forth.

In testimony that I claim the foregoing as my own I have hereto affixed my signature.

BERTEN DYRSKOG.